Feb. 8, 1966  K. E. YOUDAN  3,234,340
TELEPHONE LINE TROUBLE LOCATER
Filed Aug. 4, 1961  2 Sheets-Sheet 1

INVENTOR
KEITH E. YOUDAN
ATTORNEY

Feb. 8, 1966   K. E. YOUDAN   3,234,340
TELEPHONE LINE TROUBLE LOCATER
Filed Aug. 4, 1961   2 Sheets-Sheet 2

INVENTOR
KEITH E. YOUDAN

BY
ATTORNEY

United States Patent Office 3,234,340
Patented Feb. 8, 1966

3,234,340
TELEPHONE LINE TROUBLE LOCATER
Keith E. Youdan, Helena, Mont.
(10 Cottonwood Lane, Hoffman Rte., Livingston, Mont.)
Filed Aug. 4, 1961, Ser. No. 129,315
17 Claims. (Cl. 179—175.3)

This invention relates to a test instrument for locating faults in electric lines.

Because of the character of some intelligence transmission lines such as code signal and more particularly voice signal lines, and because of the instrumentalities which are utilized in the line and which may break down under application of high potentials, it is desirable to use low voltages in determining the existence of faults in the lines. Moreover, in view of the balanced character of some transmission lines, particularly telephone lines, it is desirable, in order to test them, to apply thereto a balanced fault seeking signal. Still further, because of the reactive components utilized in such lines it is desirable to utilize a sinusoidal fault seeking signal to the lines rather than a pulsed signal, thereby eliminating as an echo signal spurious signals generated because of the harmonics which otherwise would be created by reactive components normally used in the line. Furthermore, it is undesirable to apply test signals in sharp pulse form to lines of the character set forth above since interference with adjacent lines may result.

It is an object of this invention to provide a test instrument which may be applied, without injury, to transmission lines.

Another object of the invention is to apply a fault finding signal to a line under test which shall not create spurious responses due to reactive components in the line.

Yet another object of the invention is to provide a test instrument which can be operated on electric lines to determine the distance of a fault in the line from the instrument.

Other objects will become apparent upon consideration of the following specification when taken in conjunction with the accompanying drawing, in which:

FIGS. 3, 4 and 5 show typical displays on a cathode ray tube utilized in the instrument.

Figure 1:
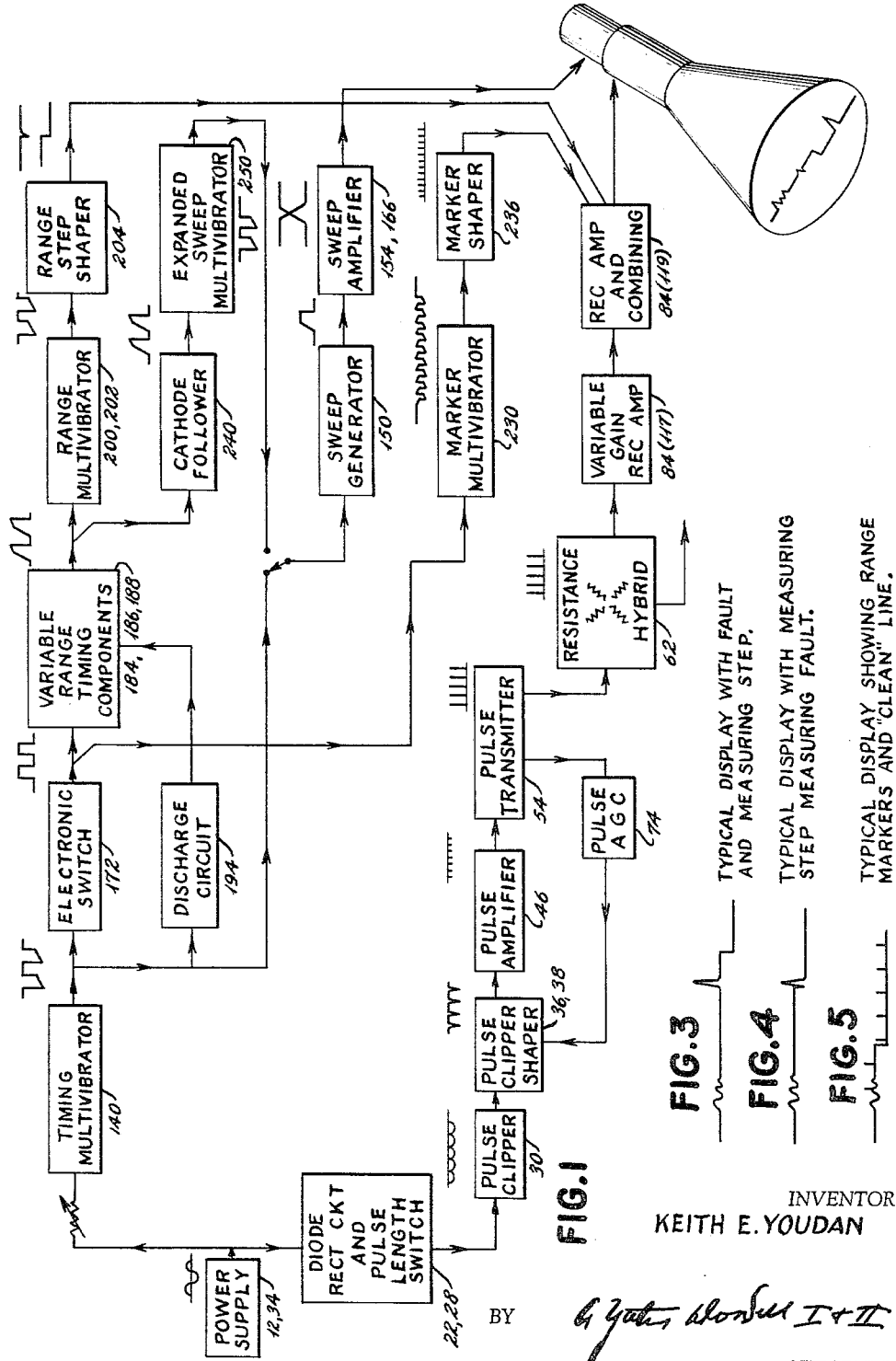
FIG. 1 is a block diagram of the instrument forming the subject matter of the invention.
Figure 2:
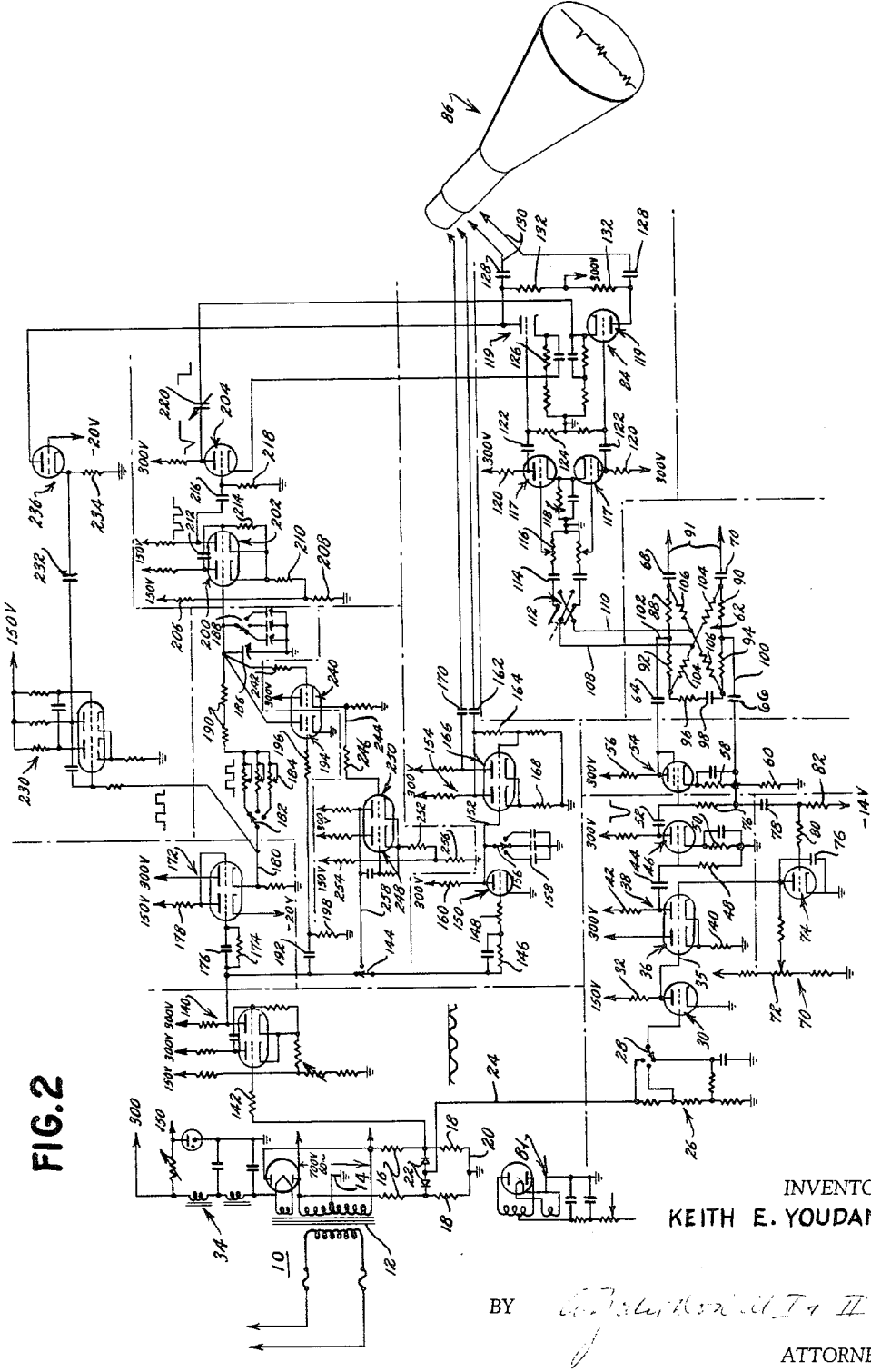
FIG. 2 is a schematic of the instrument.

A power supply 10 for the instrument comprises a transformer 12, the primary of which is connected to a conventional 60 cycle A.C. line. The high voltage secondary of the transformer is centertapped and grounded at 14. Coupled between each of the output lines of the secondary and ground is a pair of series connected resistors 16 and 18, and tapped intermediate the pairs of resistors 16 and 18 are diodes 22 arranged in opposition to each other to form a full wave rectifier with a negative line 24, connected between the diodes, negative with respect to ground. The line 24 will therefore transmit therealong full wave rectified negative sine waves. The line 24 is connected to ground via a series resistance string 26 tapped to furnish a desired variable negative potential, via a pulse length switch 28, to the grid of a clipper 30. The clipper has a cathode which is unbiased and its anode is connected via a plate resistor 32 to a 150 volt tap on a conventional full wave rectifier D.C. supply 34. Thus, in accordance with the position of switch 28, the negative half cycles applied to the grid of the pulse clipper keep the triode cut off more or less and therefore the plate potential at 150 volts except for a very brief instant (because of the cut-off characteristics of the clipper tube) when the negative cycle is close to ground or cathode potential. When the pulse length switch is set for a longer pulse, the reduced magnitude of the negative half cycles allows the tube to conduct longer, producing a wide spike of voltage.

The spikes thus made to appear at the anode of the clipper 30 are fed via a line 35 to the grid of a cathode follower triode or pulse shaper 36 and associated triode 38. The anode supply to tube 36 is 300 volts D.C. from the power supply 34 and its cathode circuit includes the resistor 40. Since the cathode of tube 38 is coupled to the cathode of tube 36, both cathodes will follow the swing of the grid of pulse shaper tube 36. The grid of tube 38 is maintained at a constant positive potential, e.g. 43 volts, by circuitry to be described, thus causing the anode voltage of tube 38 to vary in accordance with the swing of cathode voltage, the anode of tube 38 being connected via a resistor 42 to the 300 volt D.C. supply. The voltage on the grid of tube 38 is selected so that this tube is cut off during idle periods of high positive voltage (e.g. 152 volts) of the cathode. A pulse signal on the grid of the pulse shaper tube 36 will lower the cathode voltage in relation to the grid voltage in the amplifier tube 38 until the latter tube conducts during a portion of the applied pulse signal to tube 38, thereby further clipping the pulse signal appearing in the cathode of tube 36 to the desired pulse width which will appear across the anode resistor 42. The characteristic curve of the triode further shapes the pulse, this shape being controlled by the value of the anode resistor. The final shape of the pulse makes it appear somewhat sinusoidal, this shape being desirable for ease and safety in transmission of the signal through the components used in telephone and like lines, without injury to them and without creating harmonics which would give rise to false indications. The use of diodes 22 with their characteristic current-voltage curve, see Hunter Handbook of Semiconductor Electronics, first edition, 1956, section 3.4, McGraw-Hill Book Co., Inc., New York, N.Y., contributes to the formation of the pulsed waves rounded out to make the waves approach a line wave. The shaped pulse is then coupled via a capacitor 44 to the grid of the succeeding amplifier tube 46. The tube 46 is a conventional resistance coupled amplifier provided with grid leak resistor 48 and capacitor bypassed cathode resistor 50 and is designed to amplify the signal to a 45 volt peak to peak value. The amplified signal is fed via coupling capacitor 52 to the grid of the succeeding pulse transmitting tube 54 whose anode is fed from the 300 volt tap on the D.C. power supply via a resistor 56. The cathode of pulse transmitter 54 is grounded via cathode bypassed resistor 58 of high value, to offer high impedance to the flow of current through the tube when the tube is in essentially a non-conductive state, and via a series connected resistor 60 to ground. The anode and bypassed resistor 58 are connected to a resistance hybrid 62, to be described in detail, via coupling capacitors 64 and 66. The hybrid resistance is connectible by jacks or the like to both legs of a two-wire transmission line under test via capacitors 68 and 70.

The vacuum tube 54 has a characteristic low impedance when the grid is driven to near zero voltage (but never positive voltage in relation to the cathode). During idle time, the very high cathode bias resistor 58 allows a very small cathode current to flow, causing the tube to offer a high impedance in the circuit, thus allowing the transmitter side of the capacitor 64 to maintain a potential very close to the 300 volt D.C. supply and allowing the transmitter side of capacitor 66 to maintain a potential close to ground potenial.

As a shaped positive pulse signal is received on the grid of the pulse transmitter 54, the effective impedance of the tube is varied in inverse proportion to the amplitude of the incoming signal to an approximate minimum of 700 ohms. The transmitter sides of capacitors 64 and 66 are effectively connected together by the variable impedance of pulse transmitter 54, thereby applying the substantially like potentials at which capacitors 64 and 66 were charged across the hybrid through the variable impedance of 54 varied at a sinusoidal rate, thereby repeating the shaped pulses fed to the line via the hybrid. The values of capacitors 64 and 66 are chosen large enough so that the pulse signal is repeated to the hybrid without serious distortion. The pulse delivered to the line should be of low magnitude and on the order of 9 volts to prevent possible breakdown of components in the transmission line were the testing signal of a much higher magnitude.

For maintaining this 9 volt magnitude at the line jacks, an A.G.C. circuit is provided for monitoring the voltage on the grid of tube 38. A resistance string 70 is connected between the 150 volt tap on the D.C. supply and ground. Included in the string is a potentiometer 72 connected to the anode of an A.G.C. tube 74, the supply to the anode being filtered by a capacitor 76. The cathode of this tube is at ground potential.

The pulses appearing at the grid of pulse transmitter tube 54 are positive. A proportionate positive pulse will appear across the unbypassed portion of the cathode resistor 60 of the pulse transmitter (by cathode-follower like action) and is fed via capacitor 78 and resistor 80 to the grid of the A.G.C. tube 74, which grid is maintained at a negative bias, as negative 14 volts, in the absence of a signal from the output of tube 54 by a negative bias supply which feeds to the grid of tube 74 via a resistor 82 and resistor 80. The positive pulses to the tube overcome the negative bias, causing the tube to conduct, lowering the D.C. potential on the anode of tube 74, thereby lowering the grid bias voltage in tube 38. Potentiometer 72 is adjusted to give the optimum D.C. supply potential to the anode of tube 74 for optimum pulse A.G.C. action and to give the desired 9 volt pulse at the line jacks, the value of the negative bias to tube 74 (negative 14 volts) being the major factor in determining the 9 volt amplitude at the line jacks.

The resistance hybrid 62 is provided to enable a pulse to be transmitted to the wires of a line under test, without interference with transmission of echo signals to an echo receiver, here broadly indicated as 84, the receiver being coupled to a cathode ray tube 86. Furthermore, the hybrid is designed to transmit the pulse as received from the capacitors 64 and 66, equally to the line and to a network designed to match the impedance of the line. When the shaped pulse is transmitted to the hybrid via capacitors 64 and 66, the pulse energy divides and transmits in two directions, (1) via hybrid resistors 92 and 94 and appears as a voltage pulse across the network resistor 96 and network capacitor 98 and (2) via hybrid resistors 88 and 90 and appears as a voltage pulse between coupling capacitors 68 and 70 or across the line to be tested; and furthermore, if the line under test is normal the impedances of the two directions of transmission through the hybrid will be equal and the pulse energy transmission in both directions will be equal. If the pulse be transmitted to a line having various filters, repeat coils or the like on it, all of which contribute to the make up of the characteristic impedance seen by the hybrid, and this be normal, the voltage pulse seen on the line and network feed lines of the hybrid will be equal and in phase. The output resistors 104 and 106 are connected to the line points of the hybrid and are connected to the reverse polarity network points of the hybrid such that at the center points of the output resistors 104 and 106, the transmitted pulse signals is balanced out; no pronounced signal would appear via the output lines 108 and 110 and no pronounced vertical displacement of the trace on the cathode ray tube will occur. If the impedance of the line as seen by the hybrid and the network are not equal, the transmitted pulse voltage across the line side and network side of the hybrid would be unequal and a vertical displacement of the trace due to the outgoing pulse would appear. If no fault exists in the line, the shaped pulse will be dissipated or attenuated in the line. If a full fault exists, the shaped pulse will encounter an abrupt change in the characteristic impedance of the line, resulting in the creation of a pulse which will reflect back into the hybrid and into the lines 108 and 110. The hybrid 62 for a particular facility may be replaced by another hybrid for a facility having a different normal impedance as by the aid of patch cords.

The lines 108 and 110 connect via an echo inverting switch 112 to the receiver 84, the receiver being coupled to the switch by capacitors 114 and potentiometers 116. The switch may be utilized to throw the echo above the horizontal trace should it appear below the trace, the resulting position of the switch yielding useful information concerning the nature of the fault. The returning echo from a fault having the nature of a short will be 180 degrees out of phase with an echo from a fault having the nature of an open or break in the wires. The switch position, with an echo deflected above the trace which is the normal viewing manner, will be indicative of the nature of the fault and the two positions of the switch may be labeled to indicate that the fault has the nature of an "open" or "short."

The receiver is a two-stage push-pull receiver, the first stage 117 having grids biased by the resistor-capacitor combination 118 and coupled to the second stage 119 by action of the resistors 120 and capacitors 122. The grids of the second stage are connected to ground via grid resistors 124 and bypassed resistors 126. The output from the second stage is coupled to the vertical deflection coils of the cathode ray tube via capacitors 128 and leads 130, the capacitors 128 being connected between the anode resistors 132 and the coils. Thus there will appear in the cathode ray tube, vertical deflections in a horizontal trace, indicative of the existence of a fault. As will be described the location of the fault can be determined by control of a step in the horizontal trace.

The means for forming the horizontal trace will now be described.

The trace is started across the cathode ray tube just before the transmission line is pulsed in order that the condition of the entire line may be noted on the trace. To effect this result a timing multivibrator 140 is employed which serves to recognize the time that the 60 cycle voltage in the secondary of transformer 12, changing from positive potential to negative, passes a critical voltage. At this time an instantaneous voltage transition to negative in a multivibrator will start the operation of the sweep circuits, the measuring circuits and the markers. The time of initiating operation of the multivibrator may be varied, as will be described. As the transmitted pulse circuits and the timing multivibrator are supplied from the same 60 cycle source, the timing multivibrator will therefore be variable in relation to the transmitted pulse. The timing of the multivibrator is such that operation will occur at a point when the positive halfcycle is approaching but not yet at zero volts, ideally at a time 550 microseconds before reaching zero volts. This can be accomplished since, with the cutoff characteristics of the electron tube utilized in the multivibrator, conduction takes place before the grid reaches cathode potential. The multivibrator 140 comprises a pair of cathode coupled triodes with the common resistor lead of the cathodes including a potentiometer to vary the firing point of the tubes, the grid of the first tube being coupled via a resistor 142 and a resistor 16 to the secondary of the transformer. The timing multivibrator is otherwise conventional and need not be further described.

The output from the timing multivibrator is fed via a switch 144, bypassed grid leak resistor 146 and grid resistor 148 to the grid of a sweep generator 150, D.C. coupled via a line 152 to the grid of an amplifier 154. Connected to the line 152 via a switch 156 is one side of one of a series of different capacitors 158 to provide for various sweeps of the amplifier, the other poles of the capacitors being grounded. During idle time preceding a duty cycle, a positive voltage from the timing multivibrator to the grid of the sweep generator 150 renders the tube conductive and discharges the capacitors 158 therethrough. The positive to negative transition of the timing multivibrator drives the tube 150 to cut off, allowing the connected-in capacitor or capacitors to charge via the anode resistor 160, thereby driving the grid of amplifier tube 154 more and more positive. The variable potential at the plate is transmitted to one end of the horizontal deflection coil of the cathode ray tube via capacitor 162. The anode of tube 154 is connected via a voltage divider string 164 to ground, this string being tapped to provide a positive grid potential to a second amplifier tube 166, the cathode of this tube being directly coupled to the cathode of tube 154, both cathodes being connected to ground via a resistor 168. As tube 154 conducts more and more, the potential on the grid of tube 166 becomes less and less, while, due to the resistance 168, the potential on the cathode of tube 166 rises, thus cutting off this tube more and more. Since the output of tube 166 is coupled via a capacitor 170 to the opposite end of the horizontal deflection coil, the unbalanced sweep signal from the signal generator is amplified and converted to a balanced sweep signal of sufficient potential to produce the desired sweep on the cathode ray tube.

Means are provided in the instrument to create a measuring step in the horizontal trace and to move this step under manual control along the length of the trace to bring the step to a desired fault indication on the trace. The amount of manual displacement necessary to bring the step from a predetermined necessary to bring the step from a predetermined zero position on the trace to the fault is therefore a measure of the distance of the fault from the instrument. The step forming and step displacement means will now be described.

The timing multivibrator 140 controls an electronic switch 172 comprised of a pair of triodes and designed to produce a square pulse of voltage making a transition from an idle voltage of zero to about 152 volts at the instant of the timing multivibrator positive to negative transition and maintaining a very stable 152 volt low impedance supply for 4200 microseconds, at the end of which time it returns instantly to zero rest voltage. During idle time preceding duty cycle, the timing multivibrator maintains a high positive voltage to the grid of the first triode section of the switch. Grid current flows in this section through a high value grid protective resistance 174, causing a voltage drop across this resistance exceeding 300 volts and charging the paralleled capacitor 176 to the drop across the resistor. The first triode section therefore conducts heavily since the grid potential is high. The cathode has a high negative bias applied to it via supply 81, wherefore the anode potential drops to a negative potential as will the junction between anode current supply resistor 178 and the anode. This negative potential is applied to the grid of the second triode section of the switch, which section is a cathode follower with no resistor in the anode circuit. This results in a cutting off of the current flow in the second section and a zero idle voltage appearing in the output line 180. The positive to negative transition of the timing multivibrator transmits a high negative voltage to the grid of the first triode of the switch due to the charge exceeding 300 volts across the capacitor 176. As the first section is cut off, its anode potential will rise to the anode supply potential of 150 volts, as will the grid of the second section of the switch. This second section being a cathode follower circuit, its cathode will follow the sudden swing of voltage on its grid and change instantly from zero volts to about 152 volts (line voltage less drop through the tube) and supply this voltage to the line 180. During the time of the duty cycle, the charge across the capacitor 176 will discharge through the associated resistor 174, until the voltage on the associated grid allows the first section to conduct. Conduction through the first section will lower the voltage on the grid of the second section of the switch and cut off this section, returning the voltage of line 180 to zero idle volts.

The square wave thus generated is applied to the range multivibrator and step shaper and thence to the vertical deflection circuit of the cathode ray tube.

The line 180 connects via a switch 182 to a selected one of potentiometers 184 through which a main variable capacitor 186 and a selected one of parallel capacitors 188 may be charged; one or more of the capacitors 188 may be variable, if desired. A current limiting resistor 190 may be interposed in the line to the capacitors. During the idle time of the cycle, a pulse from the timing multivibrator 140, via the capacitor 192, applies a heavy positive voltage to the grid of a capacitor discharge tube 194 bridged across the paralleled capacitors 186, 188 and ground, thereby discharging the capacitors. A grid current limiting resistor 196 is provided as is also a grid leak resistor 198 to dispose of the charge on the grid of tube 194.

As the capacitors 186, 188 charge up, the range multivibrator triodes 200 and 202 will respond to the rising voltage and produce an instant voltage transition at the output of the triodes to be shaped into a measuring step by another triode 204, when the rising voltage passes a predetermined voltage of about 43 volts. With the grid of the triode at rest potential of zero volts, it is 43 volts under cutoff due to the voltage divider action of a series string resistance 206 and 208 connected across the 150 volt supply and the connection of the cathode of triode 200 to the string via resistor 210. Also current flow through triode 202 through the common resistor raises the potential at the cathode of triode 200. A positive voltage transition applied to the grid of triode 200 increases the voltage and when it rises to about 43 volts the tube 200 will conduct and start the single cycle of its operation. The time after the 152 volt zero to positive transition at which the range multivibrator will be triggered into its one cycle operation will be determined in the range determining components by the charging time of the capacitors 186, 188 through the selected one of the resistors 184 and resistor 190. The adjustment of capacitor 186 can be through an indicating knob operating in cooperation with scales to indicate "miles" or the like. Variable resistive components 184 and variable capacitive components 188 are intended for calibration. As tube 200 starts to conduct, the decreasing voltage on its anode is applied via capacitor 212 to the grid of triode 202, cutting off triode 202 instantly and causing a sharp transition at the anode of triode 202, which is shaped into a measuring step by triode 204. Grid leak resistor 214 discharges the capacitor 212.

The range step shaper 204 receives the output from the range multivibrator via coupling capacitor 216, a conventional grid leak resistor 218 being provided. The pulse at the grid of triode 204 produces a sharp negative going output pulse at the anode of the triode which is peaked by a small variable capacitor 220 and applied 180° out of phase to the cathode of one of the output triodes of the receiver 84. The effect on the cathode ray tube is therefore to impart a vertical downward step to the trace across the tube and on which pulses coming from the line under test will be impressed.

Also impressed on the horizontal trace are equally spaced markers or pips indicative of a distance, as 50 miles, between the markers. These markers are created by a circuit paralleling the circuit for producing the shiftable step just described. The lead 180 is branched and feeds a free running marker oscillator 230 of the Schmitt type, the output of which, via a variable capacitor 232, feeds a triode by impressing the output across the cathode resistor 234 of a triode 236.

The pulses fed to the cathode resistor 234 are sufficiently negative to produce brief and sharp instants of conduction of the tube 236 with consequent sharp spikes appearing at the anode of the tube. These spikes are fed to the anode of the second of the output tubes of the receiver 84 and appear at approximately 8 equally spaced distance pips or markers on the horizontal trace formed on the face of the cathode ray tube. Thus for each working pulse transmitted to the oscillator, approximately 8 pips or markers will be created. These markers can thus be used for measurements, as one pip to 50 miles, and for calibration of the instrument against actual mileage.

It is at times desirable to obtain closer observations of the form of the reflected pulse. For this purpose the vertical height may be adjusted by means of the controls on potentiometers 116.

A much expanded horiontal sweep may be obtained by use of an expanded sweep multivibrator and associated circuitry. The expanded sweep multivibrator comprises a cathode follower 240 whose grid is connected via an isolation resistor 242 to the ungrounded side of the capacitors 186, 188. The cathode follower therefore bridges the output of the range timing components at a very high impedance without affecting their operation and reproduces their output identically at a low impedance for use by the succeeding expanded sweep multivibrator. The lead 244 from the cathode of the cathode follower, via a resistor 246, is connected to the grid 248 of a Schmitt type of multivibrator 250 whose cathodes are maintained at positive potential by reason of connection of the common cathode resistor 252 to a tap on the voltage dividers 254, 256 connected across the 150 volt line. The multivibrator 250 will respond to the rising voltage output of the cathode follower 240 by producing an instant voltage transition for application to the sweep generator 150 when the rising voltage passes a predetermined critical voltage point as determined by the bias on the cathodes of the multivibrator 250. In the use of the expanded sweep multivibrator, the switch 144 leading to the sweep generator is thrown to connect with the output line 258 from the expanded sweep multivibrator, giving a horizontal expansion of a portion of the horizontal sweep across the face of the cathode ray tube which by conventional controls on the cathode ray tube may be brought to desired horizontal position.

In the overall operation of the expanded sweep, the charging of capacitor 186 produces two virtually identical but isolated rising positive potentials which are applied (1) to the grid of triode 209, conduction of which commences generation of a measuring step and (2) to the grid of triode 250, conduction of which starts the expanded sweep trace across the face of the CRT. The rising positive potential will overcome the bias of triode 250 and allow conduction, therefore commencing the expanded sweep approximately 250 microseconds before the rising voltage overcomes the bias of triode 200 and generates a measuring step. Therefore a 50 mile sweep will be started approximately 25 miles before the display of the measuring step and any 50 mile section of the line may be expanded across the entire face of the tube and a single echo may be more carefully analyzed and measured.

FIG. 3 shows a typical display on a CRT. Here the measuring step is at a distance beyond the location of the fault. In FIG. 4 the potentiometers 184 have been adjusted to bring the measuring step into coincidence with the fault. FIG. 5 shows a line without a fault and the creation of the step and the range markers.

Conventional high voltage is applied to the cathode ray tube and conventional voltage is applied to the heaters of all of the tubes, including the cathode ray tube.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A measuring instrument comprising means for coupling the instrument to a source of alternating current, generator means for converting said alternating current to pulsed waves rounded out to make the waves approach a sine wave formation, a non-inductive resistance hybrid having two output terminals for connection to a two-wire line under test, the wave form at the output terminals being undistorted from the initial form as created by the generator means, an echo receiver connected to the resistance hybrid and a cathode ray tube connected to the output of the echo receiver, the output of the generator being applied to the resistance hybrid via a pulse transmitter tube, the anode of said tube being coupled by a capacitor to one portion of the resistance hybrid and the cathode of said pulse transmitter tube being coupled by a capacitor to another portion of the resistance hybrid, whereby when the pulse transmitter tube is conducting the two capacitors will be substantially equally pulsed from the pulse transmitter tube.

2. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep.

3. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep, said last means including a control for varying the delay between the initiation of the sweep and the creation of the step.

4. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep, and additional means to create vertical pips along the sweep.

5. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep, said last means including a control for varying the delay between the initiation of the sweep and the creation of the step, and additional means to create vertical pips along the sweep.

6. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep, an expanded sweep multivibrator and means for series connecting the expanded sweep multivibrator and the sweep generator to expand the sweep across the tube.

7. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, means for creating the horizontal sweep across the tube comprising a timing multivibrator, a sweep generator whose input is connected to the output of the timing multivibrator and whose output is connected to the tube, an electronic switch connected to the output of the timing multivibrator, a capacitor charged by said switch during its duty period, there being means to discharge said capacitor during the idle period of the switch, and a range multivibrator under control of the charge on said capacitor and operative to produce a step in the horizontal sweep on the tube.

8. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, means for creating the horizontal sweep across the tube comprising a timing multivibrator, a sweep generator whose input is connected to the output of the timing multivibrator and whose output is connected to the tube, an electronic switch connected to the output of the timing multivibrator, a capacitor charged by said switch during its duty period, there being means to discharge said capacitor during the idle period of the switch, a range multivibrator under control of the charge on said capacitor and operative to produce a step in the horizontal sweep on the tube, an expanded sweep multivibrator whose input is connected at a point between the output of the electronic switch and the range multivibrator and bridging the capacitor at high impedance, and control means for connecting said expanded sweep multivibrator in series with sweep generator.

9. A measuring instrument comprising means for coupling the instrument to a source of alternating current, generator means for converting said alternating curent to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, means for creating the horizontal sweep across the tube comprising a timing multivibrator, a sweep generator whose input is connected to the output of the timing multivibrator and whose output is connected to the tube, an electronic switch connected to the output of the timing multivibrator, a marker multivibrator whose input is connected to the output of the electronic switch and whose output is connected to the vertical deflection circuit of the cathode ray tube, a capacitor charged by said switch during its duty period, there being means to discharge said capacitor during the idle period of the switch, and a range multivibrator under control of the charge on said capacitor and operative to produce a step in the horizontal sweep on the tube.

10. A measuring instrument comprising means for coupling the instrument to a source of alternating current, generator means for converting said alternating current to pulsed waves rounded out to make the waves approach a sine wave formation, a non-inductive resistance hybrid connected to the generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, means for creating the horizontal sweep across the tube comprising a timing multivibrator, a sweep generator whose input is connected to the output of the timing multivibrator and whose output is connected to the tube, an electronic switch connected to the output of the timing multivibrator, a marker multivibrator whose input is connected to the output of the electronic switch and whose output is connected to the vertical deflection circuit of the cathode ray tube, a capacitor charged by said switch during its duty period, there being means to discharge said capacitor during the idle period of the switch, a range multivibrator under control of the charge on said capacitor and operative to produce a step in the horizontal sweep on the tube, an expanded sweep multivibrator whose input is connected at a point between the output of the electronic switch and the range multivibrator and bridging the capacitor at high impedance, and control means for connecting said expanded sweep multivibrator in series with the sweep generator.

11. A measuring instrument comprising a rectifier for generating full wave rectified waves of substantially sine wave form, a pulse clipper and pulse clipper shaper connected to the output of the rectifier and shaping the waves into better sine wave form, a non-inductive resistance hybrid, a receiver and an output circuit connected to the receiver, means for amplifying the shaped waves and transmitting them to the resistance hybrid at a low voltage, an automatic gain control between the output and input of the amplifier to maintain the output of the amplifier at a constant potential at the maximum voltage of the wave, output terminals on the resistance hybrid to transmit the low voltage pulsed waves in undistorted form from that received by the hybrid to a line under test, and means in said hybrid for receiving an echo from the line under test and transmitting the same to the receiver and its output circuit.

12. A measuring instrument comprising a rectifier for generating full wave rectified waves of substantially sine wave form, a pulse clipper and pulse clipper shaper connected to the output of the rectifier and shaping the waves into better sine wave form, a non-inductive resistance hybrid, a receiver and an output circuit connected to the receiver, means for amplifying the shaped waves and transmitting them to the resistance hybrid at a low voltage, an automatic gain control between the output and input of the amplifier to maintain the output of the amplifier at a constant potential at the maximum voltage of the wave, output terminals on the resistance hybrid to transmit the low voltage pulsed waves in undistorted form from that received by the hybrid to a line under test, means in said hybrid for receiving an echo from the line under test and transmitting the same to the receiver and its output circuit, an image display tube in the output circuit of the receiver, and a device in said transmitting means and interposed between the hybrid and the display tube, for inverting an echo image on the display tube.

13. A measuring instrument comprising a transformer having a primary adapted to be connected to a sinusoidal alternating current source, and a center tapped secondary, each of the end terminals of said secondary being connected to the center tap of the secondary through the interposition of a resistor string, a pair of diodes, each of said resistor strings being tapped and connected to like poles of the diodes, the remaining poles of the diodes being connected together, a pulse clipper, pulse shaper, and pulse widener, all connected in series, said connected together poles of the diodes being connected to the input of the pulse clipper to control the same, a non-inductive resistance hybrid whose output is adapted to be connected to a pair of lines under test and whose input is connected to the output of the pulse widener, a receiver, and an output circuit connected to the receiver, and means in said hybrid for receiving an echo from the line under test and transmitting the echo to the receiver and its output circuit.

14. The structure of claim 1 wherein the hybrid comprises a circuit including, in series, a first resistor, a second resistor, a capacitor and a third resistor, all in series with the terminals of the means which connects the generator to the hybrid, a fourth resistor and a fifth resistor, each connected respectively to said terminals and to the input terminals of the line under test, series connected sixth and seventh resistors connected between one of the input terminals of the line under test and the connection between the capacitor and the third resistor, series connected eighth and ninth resistors connected in between a second one of the input terminals of the line under test and the connection between the first and second resistors and output leads to the echo receiver connected in between the sixth and seventh resistors and eighth and ninth resistors, respectively.

15. The structure of claim 1 wherein there is provided a sweep generator for creating the horizontal sweep in the cathode ray tube and means is interposed between the sweep generator and the horizontal deflection coil of the cathode ray tube to balance the sweep signal applied to opposite ends of the coil.

16. The structure of claim 15 wherein the interposed means comprises a pair of triodes with the cathodes coupled together and resistance connected to ground, the potential on an anode of a first triode being applied via a capacitor to one end of the deflection coil and via a resistor to the grid of the second triode, a resistor connected between said grid of the second triode and ground, and the anode of the second triode being coupled via a capacitor to the second terminal of the coil.

17. A measuring instrument comprising means for coupling the instrument to a source of alternating current, generator means for converting said alternating current to pulsed waves rounded out to make the waves approach a sine wave formation, a resistance hybrid connected to the wave generating means, output terminals on the resistance hybrid for connection to a pair of lines under test, the wave form at the output terminals being undistorted from the initial form as created by the generator means, an echo receiver connected to the resistance hybrid to receive echoes from the lines, a cathode ray tube in the output of the receiver, the vertical deflection of the cathode ray tube corresponding to the magnitude of the echo, a sweep generator for sweeping the ray horizontally across the tube and means superimposing a signal on the sweep generator to create a step in the horizontal sweep delayed with respect to the initiation of the sweep, and an expanded sweep multivibrator and switch means for, at will, series connecting the expanded sweep multivibrator and the sweep generator to expand the sweep across the tube.

References Cited by the Examiner

UNITED STATES PATENTS

| 2,629,024 | 2/1953 | Edwards | 179—170 |
| 2,650,345 | 8/1953 | Lozes | 324—52 |
| 2,651,752 | 9/1953 | Devot | 324—52 |
| 2,685,066 | 7/1954 | Barney | 333—11 |
| 2,705,744 | 4/1955 | Bourseau et al. | 179—175.3 |

FOREIGN PATENTS

| 1,100,802 | 3/1961 | Germany. |
| 566,022 | 12/1944 | Great Britain. |

OTHER REFERENCES

"Pulse Echo Measurements on Wire Facilities," Bell System Monograph B–1469, Abraham et al., published in Transactions of the AIEE, vol. 66, pp. 541–548, 1947.

ROBERT H. ROSE, *Primary Examiner.*

WILLIAM C. COOPER, *Examiner.*